United States Patent [19]

Hsieh

[11] Patent Number: 5,753,757
[45] Date of Patent: May 19, 1998

[54] ELECTROLUMINESCENT POLYMER COMPOSITIONS AND PROCESSES THEREOF

[75] Inventor: Bing R. Hsieh, Webster, N.Y.

[73] Assignee: Xerox Corporation, Stamford, Conn.

[21] Appl. No.: 751,530

[22] Filed: Nov. 13, 1996

[51] Int. Cl.$^6$ .................................................. C08F 8/00
[52] U.S. Cl. .......................... 525/195; 525/191; 525/192; 428/457; 428/461; 427/66; 427/294; 427/295; 427/404; 427/407.1
[58] Field of Search .................... 525/195, 191, 525/192; 428/457, 461, 456; 427/66, 294, 295, 404, 407.1

[56] References Cited

U.S. PATENT DOCUMENTS 5,247,190  9/1993  Friend et al. ............................ 257/40

*Primary Examiner*—Duc Truong
*Attorney, Agent, or Firm*—John L. Haack

[57] ABSTRACT

A process for the preparation of electroluminecent polymers comprising: polymerizing a first monomer of the formula X-cg-X with a second monomer of the formula Y-USG-Y by coupling in the presence of a metal containing reagent to form a soluble precursor polymer product of the formula -[-cg-USG-]$_n$- wherein X and Y represent substituents are capable of undergoing coupling polymerization reactions, cg represents a convertible group, USG represents an unsaturated group; and n represents the number of first and second monomers contiguously coupled, and is an integer from 5 to about 10,000; and thermally converting the precursor polymer product to form a converted polymeric product of the formula -[-cg-USG-]$_{(1-a)}$-[-CG-USG-]$_a$- wherein a is the degree of conversion, and CG is a converted group arising from conversion of the convertible group cg.

The present invention also provides analogous condensation polymerization processes for the preparation of electroluminecent polymers of the formula -[-cg-Z-USG-Z-]$_n$- wherein Z is a vinylene, imine, or phenylene group resulting from the condensation of X and Y; forming a uniform thin film of the soluble precursor polymer product; and thermally converting the thin films to form a converted polymeric product of the formula -[-cg-Z-USG-Z-]$_{(1-a)}$-[-CG-Z-USG-Z-]$_a$- wherein a is the degree of conversion, and -CG- is a converted group arising from the conversion of the convertible group -cg-.

28 Claims, 6 Drawing Sheets

ELECTROLUMINESCENT POLYMER COMPOSITIONS AND PROCESSES THEREOF

CROSS REFERENCE TO COPENDING APPLICATIONS AND PATENTS

Reference is made to commonly assigned copending applications: U.S. Ser. No. 08/313,963 (D/93095) filed Sep. 28, 1994, entitled "ELECTROLUMINESCENT DEVICE", which discloses an electroluminescent (EL) device including a polymeric tetraaryl-substituted biphenyidiamine; U.S. Ser. No. 081707,162 (D/96172) filed Sep. 3, 1996 entitled "ELECTROLUMINESENT DEVICES"; U.S. Ser. No. 08/1707,260 (D/96174) filed Sep. 3,1996, entitled "ELECTROLUMINESENCT DEVICES"; and U.S. Ser. No. 08/751,532 (D/96622) filed Nov. 18, 1996 entitled "ELECTROLUMINESCENT POLYMER COMPOSITIONS AND PROCESSES THEREOF".

Attention is directed to commonly owned and assigned U.S. Pat. No. 5,558,904, issued Sep. 24,1996, entitled "ELECTROLUMINESCENT DEVICES CONTAINING A CONJUGATED POLYMER OBTAINED VIA HALOGEN PRECURSOR ROUTE CHEMISTRY".

The disclosures of each of the aforementioned copending applications and patents are totally incorporated herein by reference.

BACKGROUND OF THE INVENTION

The present invention relates to electroluminescent polymer compositions and processes for the preparation and use thereof in, for example, electroluminescent devices such as electroluminescent displays and light emitting electrochemical cells.

More particularly, the invention relates to polymer compositions and to processes for making and using in, for example, high performance, that is, high stability and high luminosity electroluminescent displays and devices.

The present invention, in embodiments, is directed to processes for preparing soluble electroluminescent polymer compositions which processes provide considerable flexibility, efficiency, and convenience in preparing this desired class of materials, particularly polymers with intricate molecular structures, and constructing electroluminescent devices therefrom.

The present invention is directed toward processes for the preparation of conjugated polymer thin film devices, particularly electroluminescent devices. The process enables a high degree of structural design flexibility for conjugated polymers. The process provides precursor polymers with well-defined molecular structures. The precursor polymers possess sharp light emission characteristics and are useful in electroluminescent applications.

The present invention is also directed toward polymerization processes for controlling the molecular weight of the polymers, the functionality attached to and within the polymer chain, and polymer architecture using coupling or condensation reactions of appropriate monomers or monomer pairs, and which controlled factors contribute to improved stability and performance of light emitting devices constructed therefrom. Highly stable light emitting devices can be achieved by controlling the polymer architectures in accordance with the processes of the present invention.

PRIOR ART

Conjugated polymers are an important class of light emitting polymers for electroluminescent (EL) devices. Two important approaches to the fabrication of conjugated polymer thin films, include the precursor approach and side chain approach. Hsieh et al., disclosed similar poly(phenylene vinylene) (PPV) EL devices using halogen precursor routes in the aforementioned commonly owned U.S. Pat. No. 5,558,904. Son et al., reported PPV based EL devices using a xanthate precursor route, *Science*, 1995, 269, 376–380. These precursor routes involve the formation and the polymerization of highly reactive quinonoid intermediates and have been limited to PPVs, poly(naphthalene vinylenes) and poly(thienyl vinylenes). As a result, these, precursor routes are limited in structural design capability. In addition, the precursor polymers derived from these precursor routes have ill defined molecular structures because they are typically random copolymers containing from about 5 to about 50% of converted segments.

Tasch et al., *Advanced Materials*, 1995, 7, 903–906, reported poly(naphthalene vinylene) based EL devices via a precursor route involving ring opening metathesis polymerization. This type of precursor approach generally requires multi-step monomer synthesis and is not readily adaptable to large scale production.

Additional examples of polymer synthesis involving the precursor approach have been reported: polyacetylene thin films via ring-opening metathesis polymerization of cyclobutene derivatives followed by a thermal conversion involving retro-Diels Alder reaction, Edwards et al. *Polymer*, 1980, 21, 595–596; Bott et al., *Synthetic Metals*, 1986, 14, 245–269; PPV and poly(naphthalene vinylene) thin films via ring-opening metathesis polymerization, Conticello et al., *Journal of American Chemical Society*, 1992, 114, 9708–9710; Tasch et al., *Advanced Materials*, 1995, 7, 903–906; Miao et al., *Journal of American Chemical Society*, 1994, 116, 9379–9380); radical polymerization of cyclic hexadiene derivative to provide a poly(cyclohexene) precursor followed by thermal conversion to poly(p-phenylene), McKean et al., *Macromolecules*, 1987, 20, 1787–1792, Ballard et al., *Macromolecules*, 1988, 21, 294–304; polyquinoline via precursor polymer, Pelter et al., *Macromolecules*, 1990, 23, 2418–2422; and poly(p- phenylenebenzobisoxazole by condensation polymerization of 3,3'-dihydroxy-4,4'- diaminobiphenyl and 2,5-dihydroxy-bicyclo[2,2,2]octane-1,4-dicarboxylic acid to provide a precursor polymer followed by thermal conversion, Harruna et al., *Polymer*, 1993, 34, 3328, *Polymer PreDrints*, 1994, 35(1), 381–382.

The following U.S. patent is noted.

U.S. Pat. No. 5,247,190, issued Sep. 21, 1983, to Friend et al., discloses an electroluminescent device comprising a semiconductor layer in the form of a thin dense polymer film comprising at least one conjugated polymer, a first contact layer in contact with a first surface of the semiconductor layer, and a second contact layer in contact with a second surface of the semiconductor layer. The polymer film of the semiconductor layer has a sufficiently low concentration of extrinsic charge carriers that on applying an electric field between the first and second contact layers across the semiconductor layer so as to render the second contact layer positive relative to the first contact layer charge carriers are injected into the semiconductor layer and radiation is emitted from the semiconductor layer. The polymer film can be poly(p-phenylenevinylene) wherein the phenylene ring may optionally carry one or more substituents each independently selected from alkyl, alkoxy, halogen or nitro.

The disclosure of the aforementioned documents are totally incorporated herein by reference.

There exists a need for polymerization processes with high levels of control over the molecular structure and architecture of polymers, and the functionality on the polymer chain by simple and direct methodologies.

There exists a need for polymerization processes which provide convenient and versatile approaches to the fabrication of electroluminescent devices.

Solutions to the above problems and needs have been found in the compositions and processes of the present invention in embodiments thereof and which provide novel condensation and coupling polymerization process pathways in forming soluble and conjugated polymers, electroluminescent polymer products, and high stability and high performance light emitting devices formed therefrom.

SUMMARY OF THE INVENTION

Figure 1:
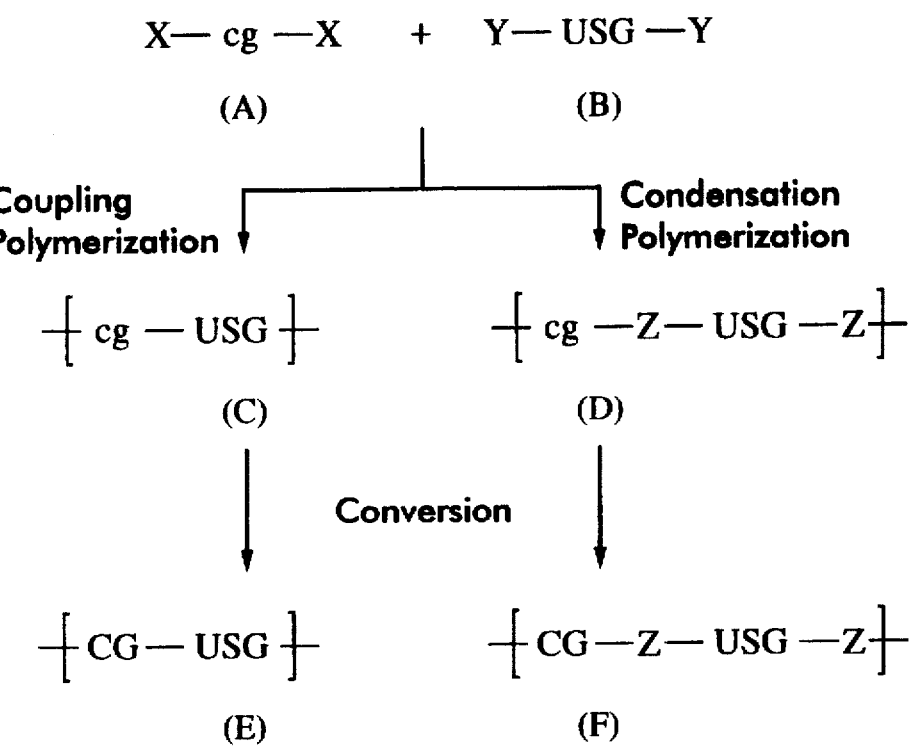
FIGS. 1 and 2 schematically summarize synthetic routes of the processes of the present invention.

It is feature of this invention to overcome or minimize the problems encountered in the art and provide processes and polymer compositions which are suitable for use in electroluminescent and electrochemical cell applications.

Embodiments, of the present invention are as illustrated herein.

DETAILED DESCRIPTION OF THE INVENTION

The present invention provides, in embodiments, processes for the preparation of electroluminescent polymers comprising:

polymerizing effective amounts, for example equivalent molar amounts of a first monomer of the formula X-cg-X with a second monomer of the formula Y-USG-Y by coupling in the presence of a metal containing reagent, or compound to form a soluble precursor polymer product of the formula -[-cg-USG-]$_n$- wherein X and Y represent substituents which are capable of undergoing coupling polymerization reactions, -cg- represents a convertible group, USG represents an unsaturated group, and n is an integer of for example from 5 to about 10,000 and represents the number of first and second monomers contiguously coupled; and thermally converting the precursor polymer product to form a converted polymeric product of the formula

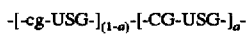

wherein a is the degree of conversion, and CG is a converted group arising from conversion of the convertible group -cg-. The degree of conversion "a" is for example a number, and in embodiments can be from about 0.05 about 0.999. The X and Y substituents, in embodiments, can be separately selected from the groups (a) a halogen and a trifluoromethylsulfonate, and (b) a boronic acid, a boronic ester, a trialkyltin, a vinyl, a terminal alkyne, a trimethylsilylacetylene, and a 2-methyl-3-butyn-2-ol group; and the metal reagent is a palladium compound, for example, dichlorobis(acetonitrile)palladium (II), dichlorobis(benzonitrile)palladium (II), dichlorobis(triphenylphosphine)palladium (II), dichlorobis(tri-o-tolylphosphine)palladium (II), palladium (II) acetate, palladium (II) chloride, tetrakis(triphenylphosphine) palladium (0), tris(dibenzylideneacetone)dipalladium (0), and mixtures thereof.

Alternatively, X and Y substituents can be separately selected from the groups of (a) a halogen and a trifluoromethylsulfonate, and (b) CuBr, ZnBr, and MgBr groups, and the metal reagent is a nickel compound selected from, for example, bis(1,5-cyclooctadiene)nickel (0), [1,3-bis(diphenylphosphino)propane]nickel (II) chloride, Ni(II) chloride-2,2'-bipyridine, Ni(II) bromide-triphenylphosphine, and mixtures thereof. In other embodiments, X and Y are independently bromine or iodine, and the metal reagent is a copper compound such as copper iodide, copper sulfate, copper powder, copper bronze. Optional co-catalysts such as potassium hydroxide, potassium carbonate, pyridine, 2,2-bipyridine, amines, ammonia, ammonium chloride, and mixtures thereof can be included if desired or indicated by the rate of reaction. Catalysts and co-catalysts can be used in any effective amount, for example, from about 0.01 to about 10 weight percent based on the weight of the reactant monomers.

In still other embodiments, X and Y can be independently selected from carbazole, thiophene, oligothiophene, pyrrole, or oligopyrrole groups, and the metal reagent is a Lewis acid such as aluminum chloride, ferric chloride, arsenic pentafluoride, antimonate pentachloride, and mixtures thereof. When these monomer types are selected, the coupling polymerization can be accomplished by electrochemical oxidation.

Figure 2:
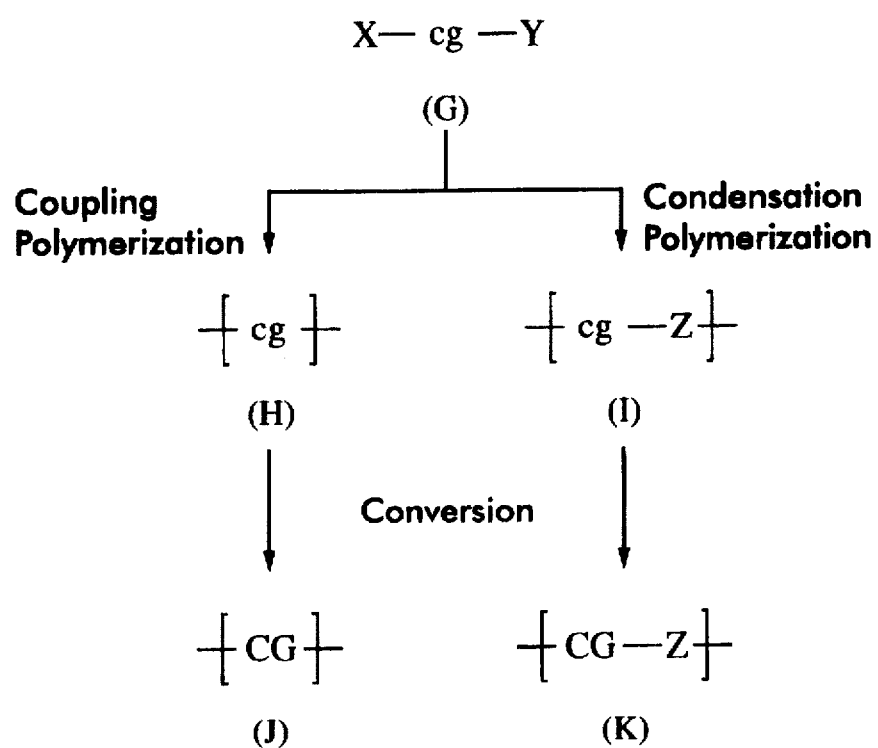

FIGS. 1 and 2 schematically summarize available routes to the processes of the present invention. FIG. 1 is a two monomer system wherein monomers (A) and (B) can be directed to undergo either a coupling polymerization or a condensation polymerization to provide respective precursor polymer products (C) and (D). The precursor products are then thermally converted to provide partially or fully conjugated polymer products (E) and (F). X and Y are polymerizable groups, Z is a group resulting from the condensation of X and Y, -cg- is a convertible group, CG represents a converted group arising from -cg-, and USG is an unsaturated group which may be identical to or different from CG. (A) and (B) are either coupling type or condensation type monomers as illustrated herein.

FIG. 2 illustrates a single monomer system wherein monomer (G) has two polymerizable groups that undergo coupling or condensation polymerization depending on the selection of the starting materials and reaction components and conditions to provide a precursor polymer (H) or (I) respectively. These can then be converted to the final polymers (J) and (K) respectively. X and Y are polymerizable groups, Z is a group arising from the condensation reaction of X and Y, (G) is either a coupling type or condensation type monomer, and -cg-, CG, and USG are as defined above.

The convertible group -cg- can be selected, for example, from the groups as represented by the formulas:

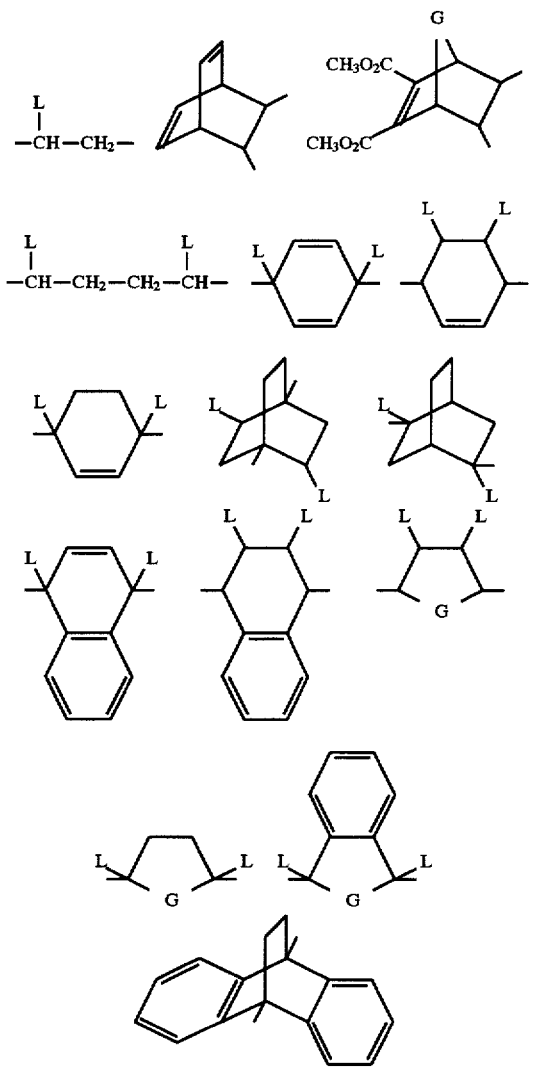

wherein L is a leaving group selected, for example, from halogen, hydroxy, methoxy, trifluoromethyloxy, benzyloxy, trimethylsilyl, methylthio, alkylsulfoxide, phenylthio, phenylsulfoxide, alkylsulfone, phenylsulfone, acetate, trifluoroacetate, phenylcarbonate, alkylcarbonate, trifluoromethylcarbonate, N,N-dialkyldithiocarbamato, alkyl xanthato, and mixtures thereof, and wherein G is for example, $CH_2$, $CH_2CH_2$, O, S, Se, NH, $NCH_3$, $NC_6H_5$, and mixtures thereof.

The unsaturated group USG, which may be the same or different from the converted group CG, and this USG group is for example selected from the groups as represented by the formulas:

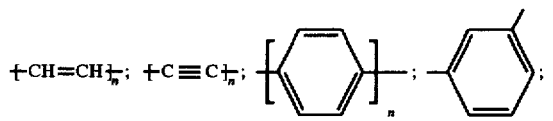

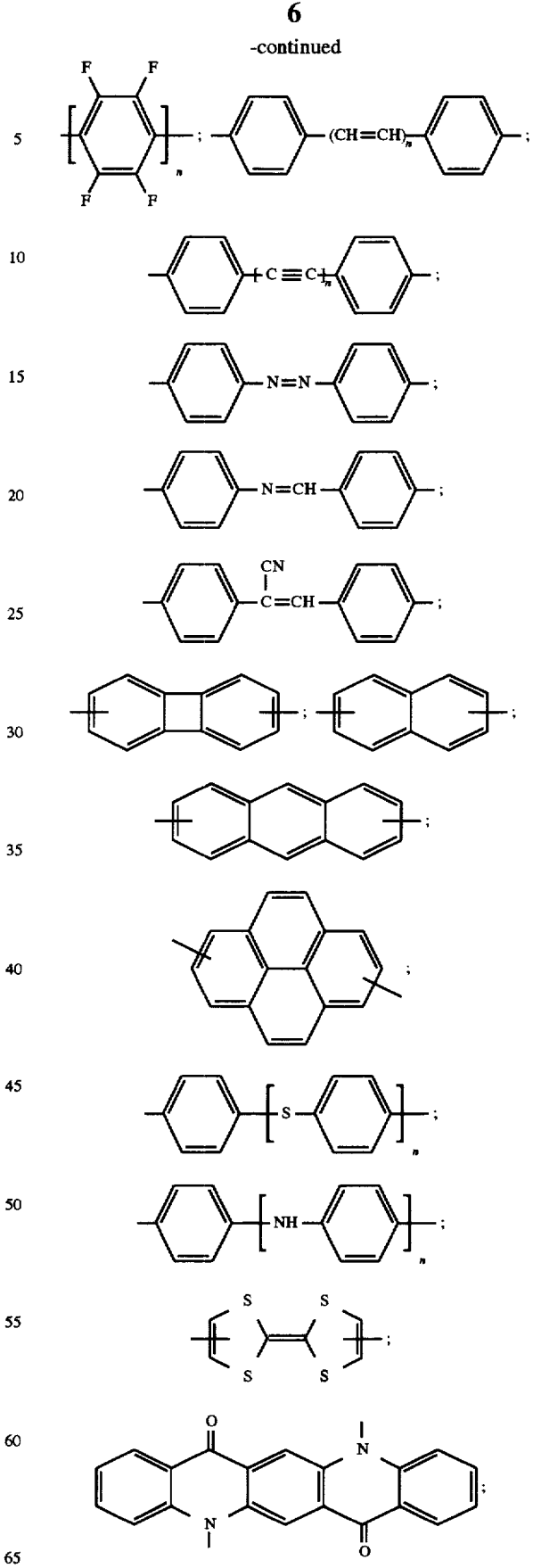

-continued

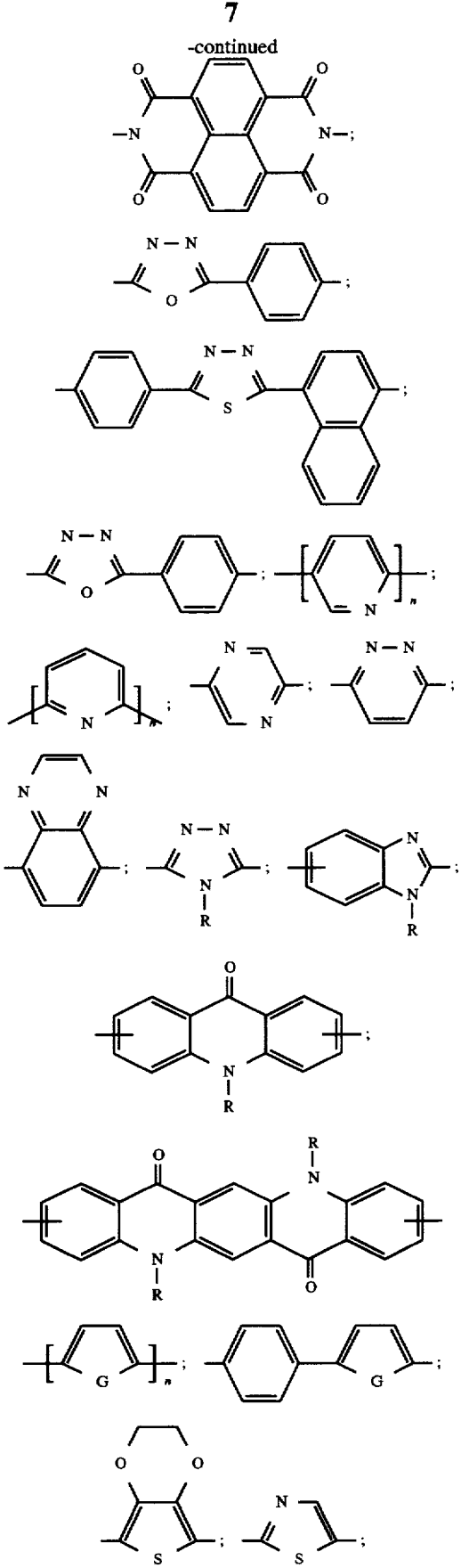

-continued

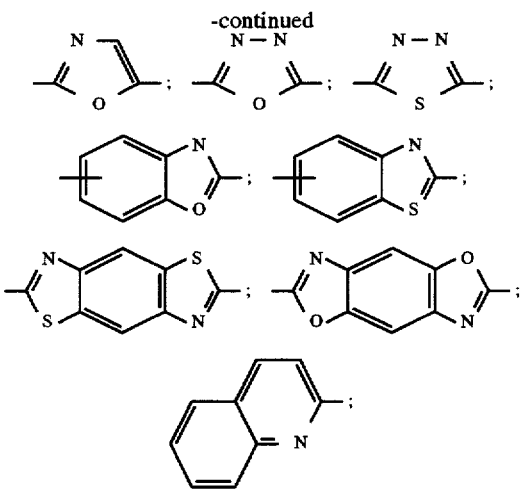

wherein G is for example, from $CH_2$, $CH_2CH_2$,O, S, Se, NH, $NCH_3$, and $NC_6H_5$. R can be a hydrogen, and alkyl with from 1 to about 20 carbon atoms, or an aryl with from 6 to about 25 carbon atoms; and n is an integer from 1 to about 10 representing oligomers. Examples of alkyl groups are n-hexadecyl, and the like. Examples of aryl substituents are phenyl, naphthyl, and the like. Examples of oligomers are tetrakis(2,6-pyridine) and the like.

Figure 3:
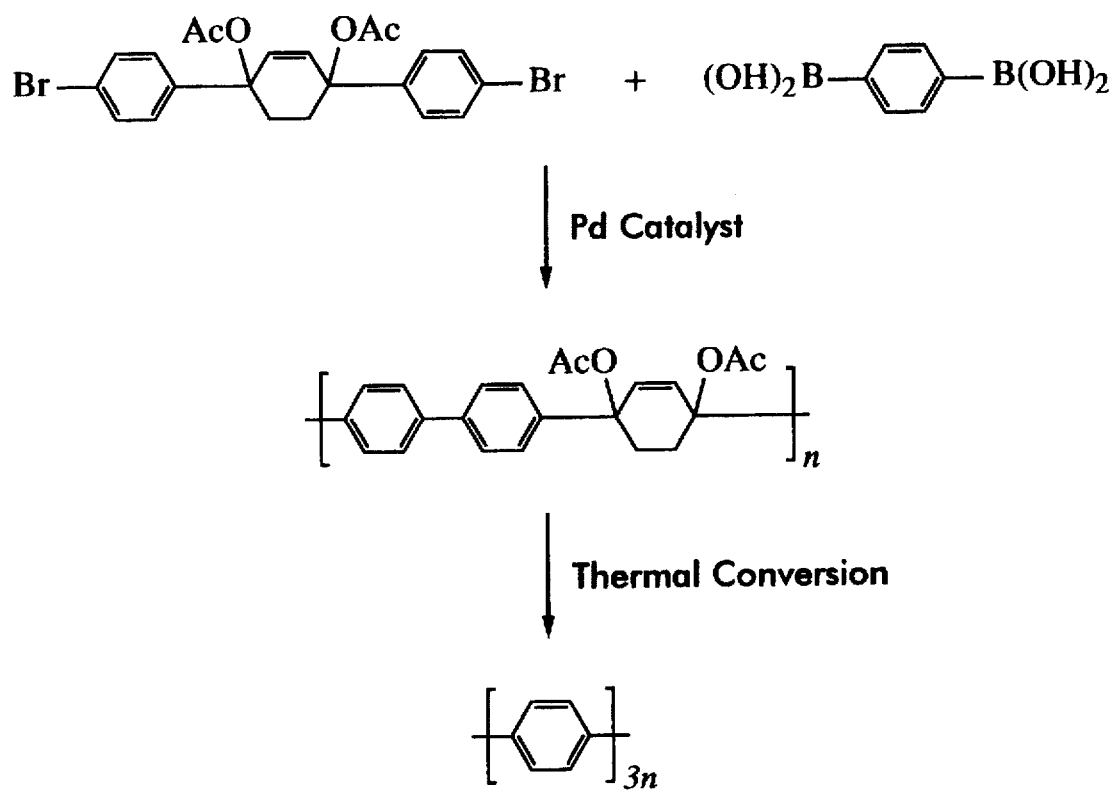
FIG. 3 illustrates an exemplary Suzuki-Miyaura coupling polymerization route in embodiments of the present invention.

Suitable coupling reactions for the polymerization generally involve metal, for example, Pd, Ni, or Cu, catalyzed reactions. The Pd catalyzed reaction includes but not limited to the Suzuki-Miyaura reaction, the Stille reaction, the Heck reaction, the Sonogashira type coupling reaction, see Jiro Tsuji, "Palladium Reagents and Cataysts", Wiley and Sons, Chichester, 1995. In the Suzuki-Miyayra reaction the polymerizable groups X and Y can be interchangeably selected from X=Cl, Br, I, or $-OSO_2CF_3$ and Y=B(OH), $B(OCH_2)_2$, as exemplified in FIG. 3. In the Stille system the polymerizable groups can be interchangeably X=Br, I or $-OSO_2CF_3$ and $Y=Sn(CH_3)_3$ or $Sn(Bu)_3$. For the Heck reaction the polymerizable groups can be interchangeably X=vinyl groups, such as, $-CH=CH_2$, $-CH=CH-CH_3$, $-CH=C(CH_3)_2$, and $-C(CH_3)=C(CH_3)_2$, and Y=Br, I, or $-OSO_2CF_3$. For the Sonogashira type coupling, the polymerizable groups can be, for example, X=alkynes, such as ethynyl, trimethylsilylacetylene, 2-methyl-3-butyn-2-ol and the like, and Y=Br, I, or $-OSO_2CF_3$.

Applicable Ni catalyzed coupling reactions include the Semmelhack-Yamamoto type coupling, T. Yamamoto et al., Macromolecules, 1992, 25, 1214–1223); the Tamao-Kumada type coupling, K. Tamao et al., Tetrahedron, 1982, 38, 3347–3354; and Colon type coupling reactions, I. Colon et al., J. Ora. Chem., 1986, 51, 2627–2637, and U.S. Pat. No. 4,263,466. The Ni catalysts can be selected from, for example, Ni(O) complexes or Ni(II) salts, such as, bis(1,5-cyclooctadiene)nickel (0), [1,3-bis(diphenylphosphino) propane]nickel (II) chloride, Ni(II) chloride-2,2'-bipyridine, Ni(II) bromide-triphenylphosphine, mixtures thereof, and the like.

Copper catalyzed coupling reaction includes the Ullman reaction, wherein the polymerizable groups X and Y can be iodo groups, and the Eglinton reaction, wherein the polymerizable groups X and Y are terminal alkyne groups, J. March, "Advanced Oraanic Chemistry", 3rd ed., 1985. Copper catalysts include Cu powder, copper bronze powder, copper (II) sulfate, and copper (I) acetate. Co-catalysts such as potassium hydroxide, potassium carbonate, pyridine, ammonia, ammonium chloride and the like, can be selected if desired or indicated by the polymerization reaction rate.

McMurry type coupling can also be used for the coupling polymerization reaction. The polymerizable groups X and Y are aldehyde or ketone groups and the catalysts are preferably low-valent Ti (O) and Ti (I) compounds such as TiCl₃ or TiCl₄ in the presence of reducing agents, such as Zn, Li, LiAlH₄ and the like. D. Lenior, *Synthesis*, 1989, 883–897; J. E. McMurry, *Chem. Rev.*, 1989, 89,1513–1524.

Coupling polymerization conditions also include Lewis acid catalyzed polymerization or electrooxidative polymerization of monomers. The polymerizable groups X and Y are terminal heterocyclic groups such as thiophene, pyrrole, carbazole. Lewis acids are ferric chloride, pentafluoroarsenate, silver hexafluoroantimonate, and the like, see for example, J. L. Bredas and R. Silbey eds., "*Coniuaated Polymers*", Kluwer Academic Publishers, 1991.

Figure 4:
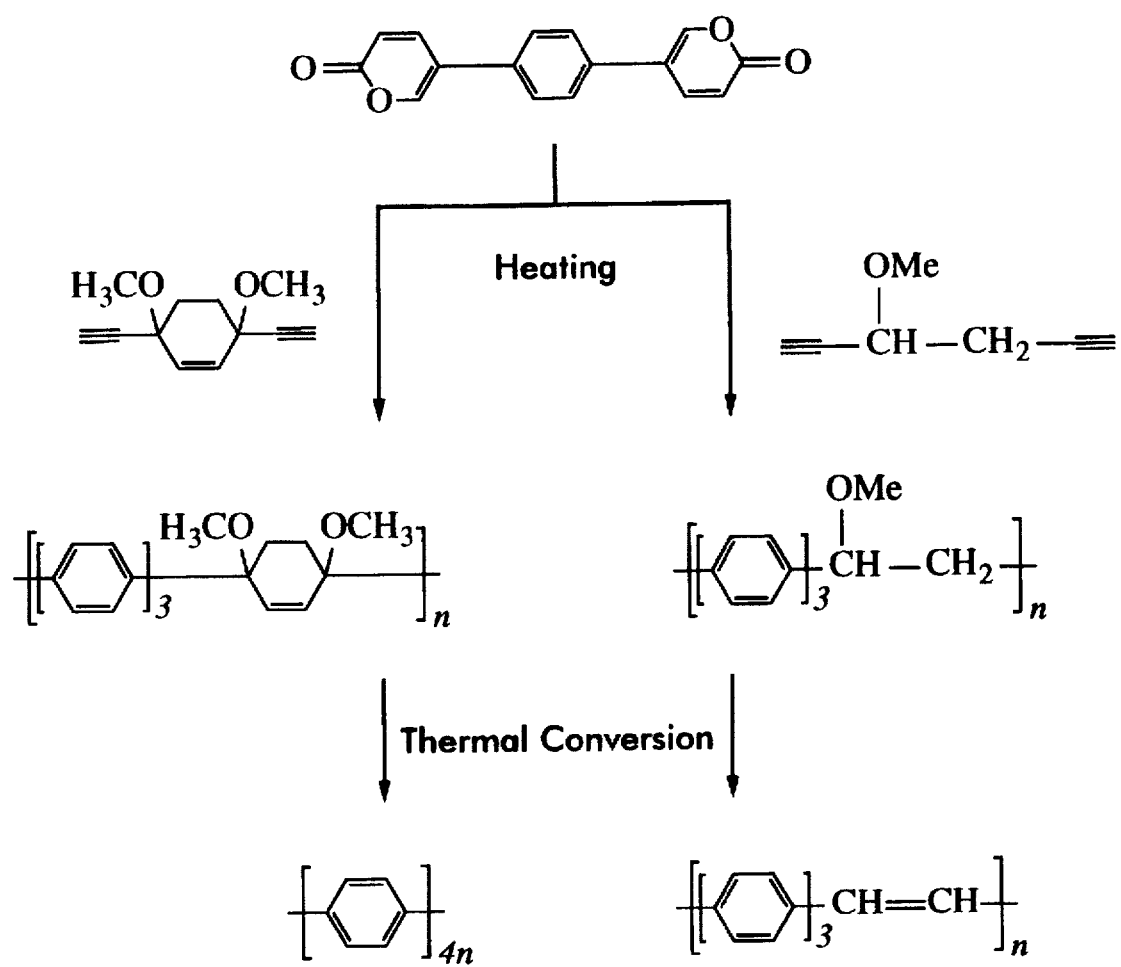
FIGS. 4 and 5 illustrate exemplary Diels-Alder polymerization condensation routes for embodiment of the present invention.
Figure 5:
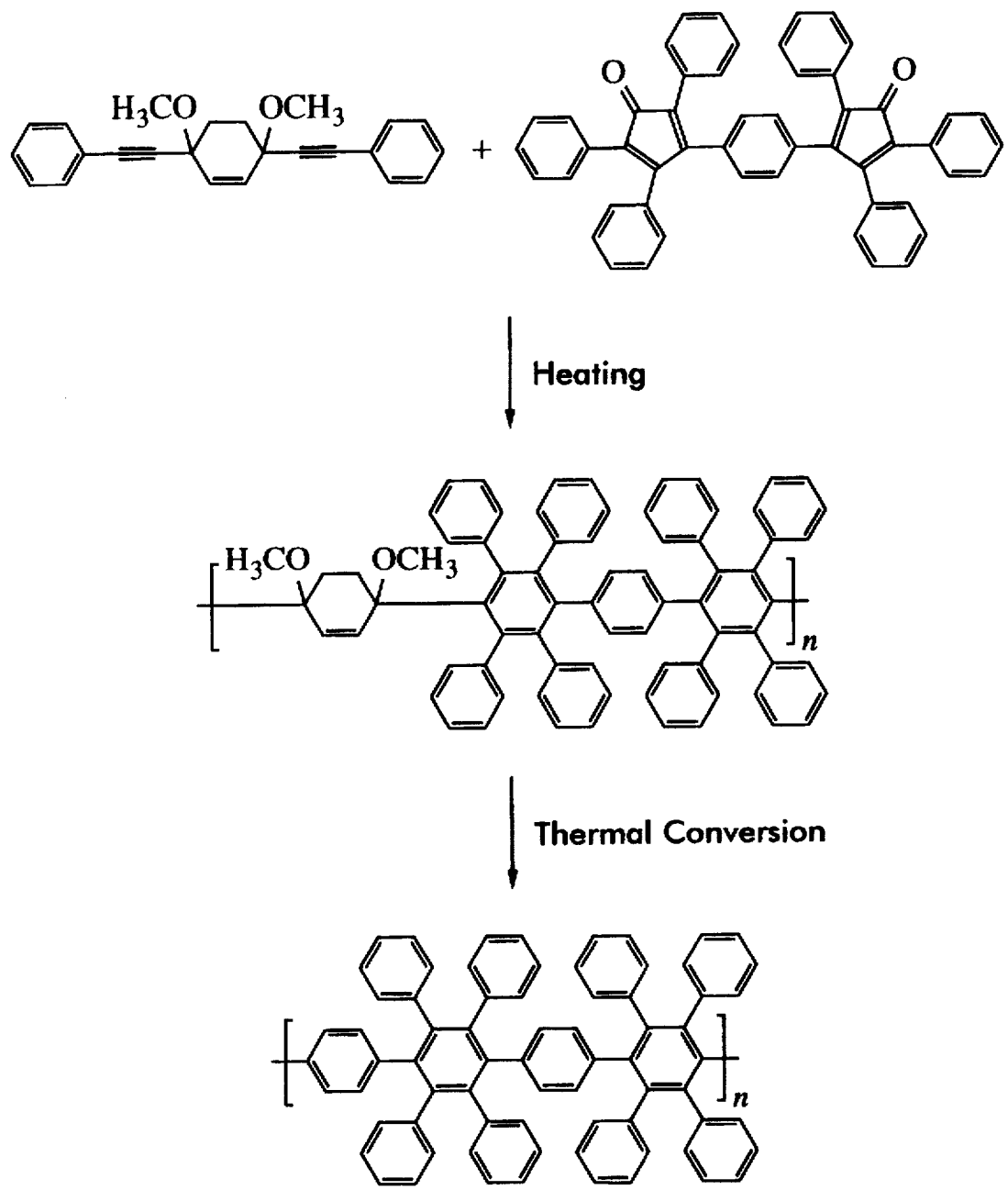

Suitable condensation polymerizations include, but are not limited to, the Diels-Alder reaction, the Wittig reaction, the Knoevenagle, imine condensation, and an olefin metathesis reaction. FIGS. 4 and 5 provide exemplary Diels-Alder polymerization route approaches, for example, a tetraphenyl-substituted 2-pyrone and alkynes can be the polymerizable groups. A benzene group or ring results from the electrocyclic condensation of a 2-pyrone and alkyne monomers. A fully conjugated polymer is obtained following a complete thermal conversion.

In Wittig type reactions, the polymerizable group X (or Y) is an aldehyde group and Y (or X) can be selected from phosphonic acid dialkyl ester, trisphenylphosphonium halides, trisbutylphbsphonium halides, and the like. The resulting Z group arises from the condensation of X and Y and is a vinylene group. Strong bases such as sodium methoxide, sodium ethoxide, potassium t-butoxide and lithium t-butoxide are generally required to effect these polymerizations.

Figure 6:
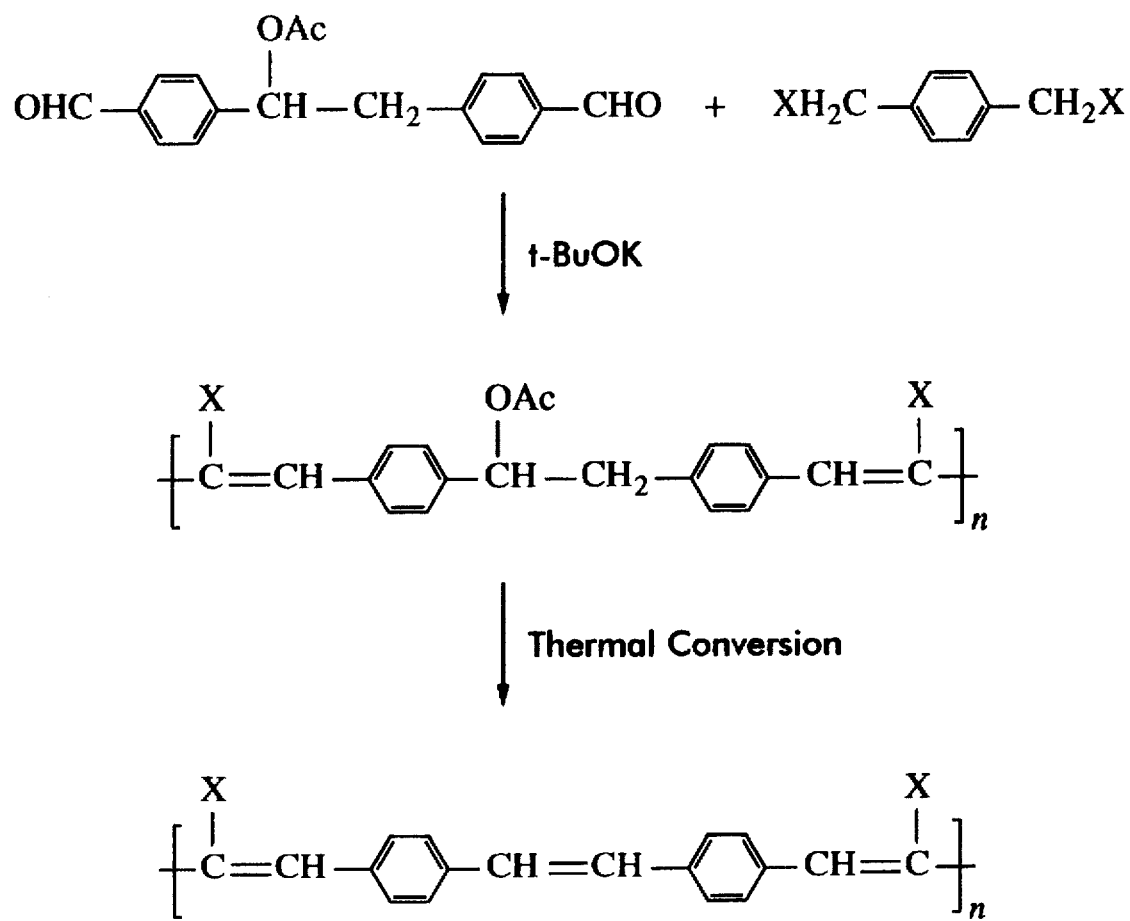
FIG. 6 illustrates an exemplary Knoevenagle reaction polymerization route in embodiments of the present invention.

FIG. 6 illustrates an exemplary Knoevenagle reaction polymerization system wherein the polymerizable group X (or Y) is, for example, an aldehyde group and Y (or X) can be, for example, selected from -CH₂CN, -CH₂SO₂Ph, -CH₂CF₃, and the like electron withdrawing methylene groups. The resulting Z group arises from condensation of X and Y and is for example, a -CN, -SO₂Ph, or -CF₃ substituted vinylene group. Strong bases such as sodium methoxide, sodium ethoxide, potassium t-butoxide, and lithium t-butoxide are also generally required to effect these polymerization.

In imine condensation polymerizations, the polymerizable group X (or Y) is NH₂ and Y (or X) is a CHO group.

The condensation of an -NH₂ and a -CHO provide an imine group. A proton scavenger such as triethylamine or pyridine bases are generally required to effect these polymerizations.

In the olefin metathesis polymerizations, the polymerizable groups are olefins such as vinyl or methyl vinyl groups. Preferred catalysts are W, Mo, and Ru based systems, such as, MOCl₅, WCl₆, Schrock's catalysts, such as 2,6-diisopropylphenylimidoneophylidene molybdenum bis(t-butoxide), 2,6-diisopropylphenylimido neophylidenemolybdenum bis(hexafluoro-t-butoxide), 2,6-diisopropylphenylimido neophylidenemolybdenum bis (trifluoromethanesulfonate)dimethyoxyethane adduct, and ruthenium carbene complexes, such as [(Cy₃P)₂Cl₂Ru= CHCH=CPh₂ and (Cy₃P)₂Cl₂Ru=CHPh, wherein Ph is phenyl and Cy is cyclohexyl group, Lynn et al., *J. Am. Chem. Soc.*, 1996, 118, 784–790.

Forming a precursor polymer can be accomplished by solution polymerization in from about 2 hours to about 1 week at 25 to 250° C. Once the precursor polymer is formed, a thin film of the soluble precursor polymer product is formed by conventional known methods, and thereafter thermal conversion of the precursor to the partially or completely conjugated product is achieved at a temperature of about 100 to about 350 ° C. for 1 to about 24 hours in the presence of a catalytic amount of hydrogen halide gas. Initial or precursor polymerization is differentiated from the thermal conversion step in that it provides a unconjugated polymer product from monomer reactants and is achieved at generally lower temperatures and in the absence of an acid catalyst.

In the coupling pathway process embodiments of the present invention involving two monomers, that is a first monomer and a second monomer, the second monomer can be for example, hexamethylditin, hexabutyiditin, 1,2-di (trimethyltin)ethene, 1,4-di(trimethyltin)benzene, 4,4'-di (trimethyltin)biphenyl, 4,4'-[di(trimethyltin)]phenyl ether, 4,4'-[di(trimethyltin)]phenyl sulfide, 1,4-phenylene-bis-boronic acid, 1,4-phenylene-bis-(ethylene glycol borate), 1,4-phenylenebis(pinacol boronate), 1,4-phenylene-bis (diisopropoxyborate), 4,4'-biphenylenediboronic acid, 4,4'-biphenylenebis(ethylene glycol borate), 4,4'-bis(boronic acid)phenyl sulfide, 1,4-diiodobenzene, 4,4'-diiodobiphenyl, 1,4-phenylene diacetylene, 1,4-divinyl benzene, 1,4-phenylene bistriflate, 4,4'-biphenylene bistriflate, 1,4-dichlorobiphenyl, 2,2'-bipyridine-6,6'-dimagnesium bromide, 2,2'-bithienyidizinc bromide, and the first monomer can be, for example, as represented by the formulas wherein OAc is acetate and Me is methyl

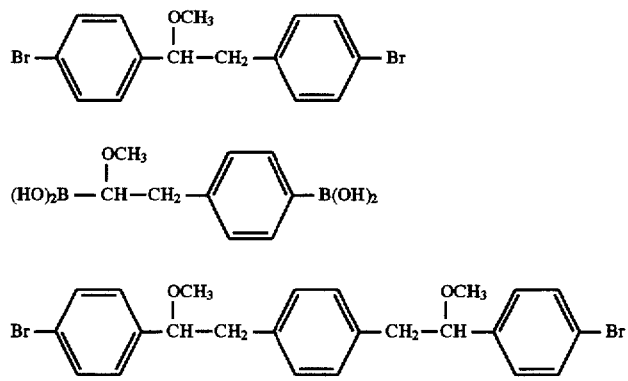

-continued
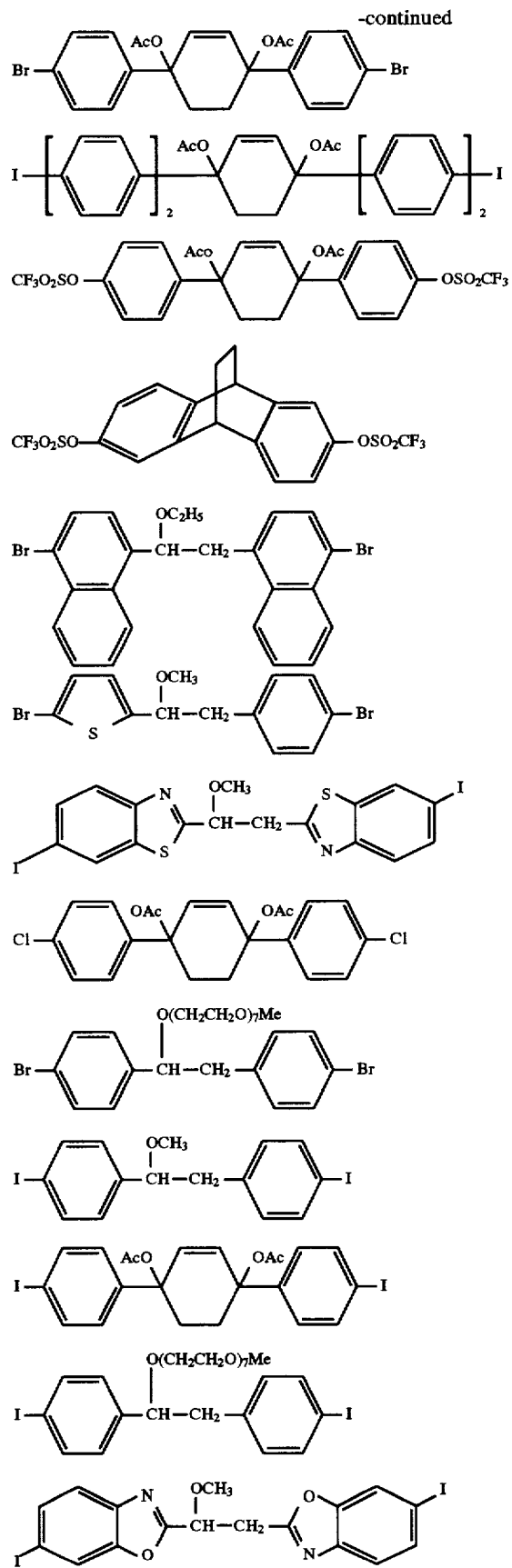

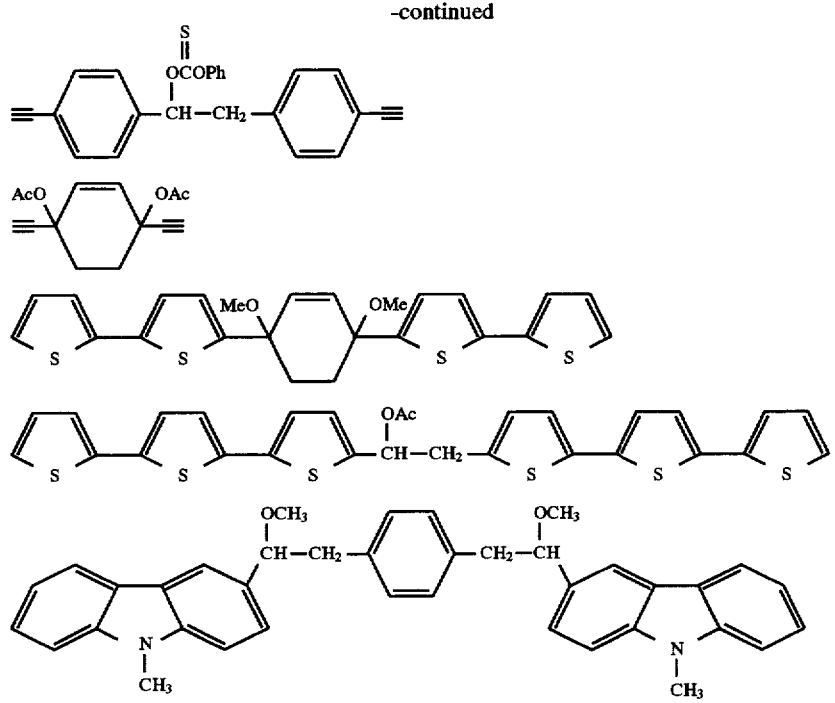

In embodiments, the soluble precursor polymer product has a weight average molecular weight of from about 1,000 to 100,000.

In embodiments, the preparation of electroluminescent polymers of the present invention can be achieved in processes comprising: polymerizing a solution of a coupling monomer of the formula Br-$C_6H_4$-$CH_2$-CH($OCH_3$)-$C_6H_4$-Br with a monomer of the formula $(HO)_2$B-$C_6H_4$-$C_6H_4$-B$(OH)_2$ in the presence of a catalytic amount of tetrakis (triphenylphosphine)palladium to form a soluble precursor polymer product of the formula

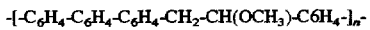

wherein n is an integer from about 5 to about 1,000; forming a uniform thin film of the soluble precursor polymer product; and heating the thin film to about 150 to about 350° C. for about 5 hours with a catalytic amount of hydrogen chloride to form a converted polymeric product of the formula

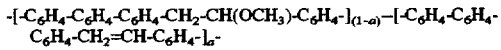

wherein a is the degree of conversion and is equal to from about 0.05 to about 0.99. In this illustration, both the soluble precursor polymer poly(p-tetraphenylene 1-methoxy ethyne) and the converted polymer product are electroluminescent polymers with a molecular weight of from about 1,000 to about 100,000.

With the intermediate polymer products there can be prepared electroluminescent devices comprising: a conductive transparent or semitransparent conductive substrate; a thin film of a precursor polymer thereover, wherein the film is of uniform thickness in the range 10 nm to 1 microns, and at least one low work function metal electrode deposited on the polymer thin film. Alternatively, there can be prepared an electroluminescent device comprising: a conductive transparent or semitransparent conductive substrate; a thin film of converted electroluminescent polymer thereover, with a degree of conversion "a" of from 0.05 to 0.99, wherein the polymer has electroluminescence at from about 400 to about 700 nm, and at least one low work function metal electrode deposited on the polymer thin film.

In embodiments, there are provided condensation polymerization processes for the preparation of electroluminescent polymers comprising: polymerizing equivalent molar amounts of a first monomer of the formula X-cg-X with a second monomer of the formula Y-USG-Y, optionally in the presence of a metal containing reagent, to form a soluble precursor polymer product of the formula

wherein X and Y represent condensation polymerizable groups, Z is a vinylene, imine, or phenylene group resulting from the condensation of X and Y, -cg- represents a convertible group, -USG- represents an unsaturated group, and n is an integer from 5 to about 10,000, and represents the number of first and second monomer pairs contiguously condensed; forming a uniform thin film of the soluble precursor polymer product; and thermally converting the thin films of the precursor polymer product to form a converted polymeric product of the formula

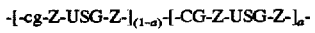

wherein a is the degree of conversion, and -CG- is a converted group arising from the conversion of the convertible group -cg-. The substituents X and Y are necessarily different and are therefore separately selected from the groups (a) a 2-pyrone or cyclopentadienenone group, and (b) an alkyne group, and wherein the resulting condensation group Z is a phenylene group. In embodiments, X can be an aldehyde and Y is a methylene group adjacent to at least one electron withdrawing group selected, for example, from dialkyl phosphonate, nitro, cyano, trifluoromethyl, pentafluorophenyl, triphenylphosphonium halide, phenylsulfone, and the like groups, and mixtures thereof, and the resulting condensation group Z is a vinylene group containing at least one electron withdrawing group. In embodiments, X is an amino or ammonium halide group, Y is an aldehyde, and the resulting condensation group Z is an imine group. When X and Y are aldehyde substitutents, and the metal reagent is preferably a low-valent Ti (0) or Ti (I) compound in the presence of a reducing agent and wherein the resulting condensation group Z is a vinylene group. When X and Y are both vinyl or methylvinyl groups and the metal reagent is, for example, a W, Mo, or Ru compound, and the resulting condensation group Z is a vinylene group.

Polymerization processes of the present invention to form a precursor polymer can be accomplished by solution polymerization in from about 2 hours to about 1 week at 25° to 250° C. Whereas the thermal conversion of the soluble precursor polymeric product thin films are accomplished at temperatures of about 100 to about 350° C. in from about 1 to about 24 hours, preferably in the presence of a catalytic amount of hydrogen halide gas under vacuum, under an inert atmosphere, or under hydrogen gas.

In embodiments, when the aforementioned condensation polymerization route is selected using electrocyclic reactants, the second monomer can be, for example, di-(2-pyron-6-yl), di-(2-pyron-4-yl), 1,4-di(2'-pyron-4'-yl)benzene, 1,3-di(2'-pyron-4'-yl)benzene, 4,4'-di(2"-pyron-4"-yl)biphenyl, 3,3'-di(2"-pyron-4"-yl)biphenyl, 2,5-dimethoxy-1,4-di(2'-pyron-4'-yl)benzene, 1,4-phenylenebis(2',4',5'-triphenylcyclopentadienon-3'-yl), 4,4'-biphenylenebis(2",4",5"-triphenylcyclopentadienon-3"-yl), 4,4'-[bis(2",4",5"-triphenylcyclopentadienon-3"-yl)]-p-diphenylether, 1,4-phenylenebis(2',5'-diethoxycarbonyl-4'-phenylcyclopentadienon-3'-yl), 4,4'-biphenylenebis(2",5"-diethoxy,arbonyl-4"-phenycyclopentadienon-3"-yl), N-methyl-3,6-diformylcarbazole, 2,5-dimethoxy-1,4-phenylenediacetonitrile, 1,3-phenylenediacetonitrile, 2,5-diacetonitrile-1,3,4-oxadiazole, 2,5-diacetonitrile-3,4-(ethylene glycoloxy)thiophene, p-xylylenediphosphonic acid tetraethyl ester, p-xylylenebis(triphenylphosphonium bromide), 2,6-di(methylphosphonic acid tetraethyl ester) pyridine, 2,6-di(2',2',2'-trifluoroethyl)pyridine, 1,4-di(nitromethyl)-2,3,5,6-tetrafluorobenzene, N-methyl-3,6-carbazoledi(ammonium chloride), 2,5-dimethoxy-1,4-diaminobenzene, 3,4-diphenyl-2,5-di(4'-aminophenyl)thiophene, and the first monomers can be, for example, as represented by the formulas

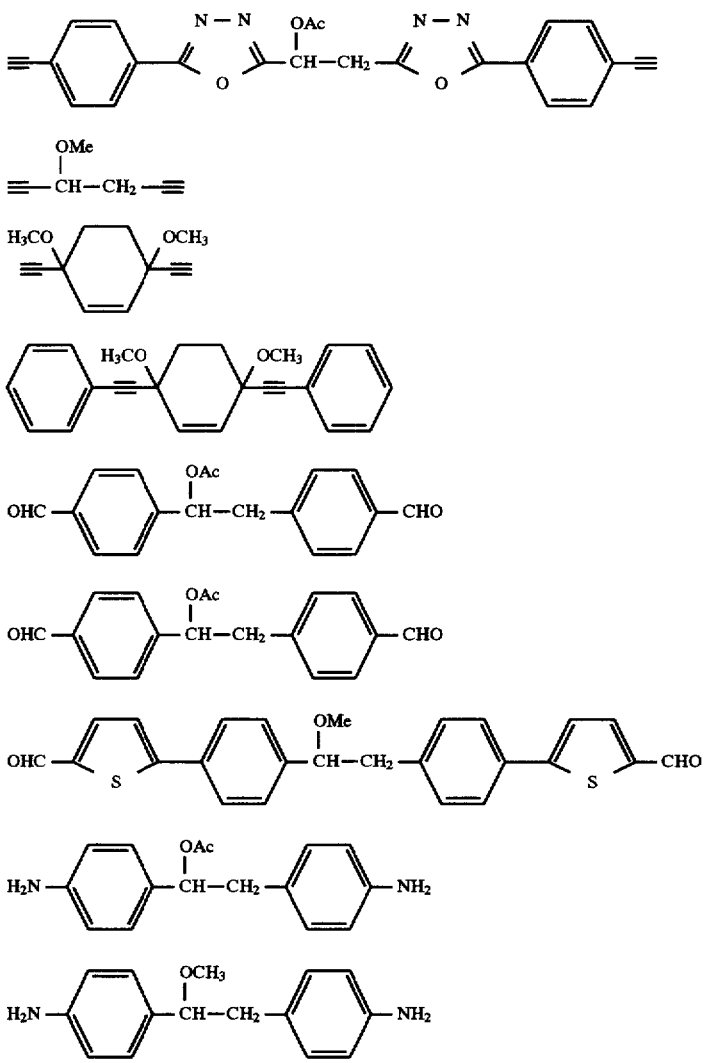

-continued

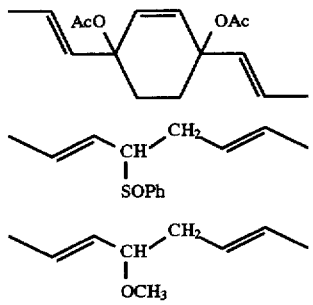

In embodiments, both he precursor polymer and the converted polymer can be electroluminescent polymers with a molecular weight of from about 1,000 to about 100,000.

In embodiments, there is provided an electroluminescent device comprising: a conductive transparent or semitransparent conductive substrate; a thin film of a precursor polymer as recited above, wherein the film is of uniform thickness in the range of from about 10 nm to about 1 microns; and at least one low work function metal electrode deposited on the polymer thin film.

Alternatively, there can be prepared an electroluminescent device comprising: a conductive transparent or semitransparent conductive substrate; a thin film of an a converted electroluminescent polymer recited above and as illustrated herein, with a degree of conversion "a" of from 0.05 to 0.99, wherein the electroluminecent polymer has electroluminescence at from about 400 to about 700 nm, and at least one low work function metal electrode deposited on the polymer thin film.

The thickness of the substrate can be from about 25 to about 1,000 microns or more, as the structural demands of the device require. The thickness of the electrodes can range from about 10 to about 5,000 Angstroms with the preferred range dictated by the optical constants of the electrode materials.

Preferred solvents for polymer solubilization and film coating step include, for example, methylene chloride, chloroform, 1,2-dichloroethane, 1,1,2-trichloroethane, o-dichlorobenzene, chlorobenzene, tetrahydrofuran, and the like.

In embodiments, preferred semi-transparent conductive substrates include indium tin oxide or gold coated glass, quarts, polyester, polycarbonate, polysulfone, and the like materials known to those of ordinary skill in the art. The indium tin oxide or gold can also, if desired, be overcoated with a thin carbon layer. Also included within the scope of the present invention for the preparation of EL devices are thin layers of p-doped conjugated polymer such as polypyrrole, polythiophene, or polyaniline, which can be readily deposited on, for example, the indium tin oxide layer.

In another embodiment, an electron transport layer can be deposited on the EL polymeric thin film to provide a two-layer device, reference for example, the aforementioned commonly owned U.S. Pat. No. 5,558,904.

In embodiments, preferred cathodes are low work function metals such as lithium, magnesium, calcium, aluminum, and alloys thereof.

The following examples are illustrative of the invention embodied herein. All amounts are by weight percent unless specified otherwise.

Examples I through VII show the synthesis of monomers containing convertible groups that can be converted to a vinylene group in accordance with the teachings of the present invention. Examples I-VII describe and demonstrate exemplary syntheses of polymer precursors and Example IX describes and demonstrates an exemplary synthesis of precursor polymers. Example X demonstrates film formation and device preparation thereof from the conversion of the precursor polymer with or without thermal conversion to an electroluminescent polymer.

EXAMPLE I 1,2-Di(p-bromophenyl)-1-hydroxyethane: Into a 500 mL bound bottom flask was added p-bromophenylacetic acid (50 g, 0.23 mol) and thionyl chloride (110 g, 0.92 mol) which was refluxed for 1 h and then cooled. The excess thionyl chloride was removed in vacuo to provide a solid (50.9 g). To this was added bromobenzene (73 g, 0.46 mol) and methylene chloride (200 mL) to provide a solution. Aluminum chloride (37 g) was added portion-wise. The resulting mixture was refluxed for 1.5 h and then cooled, followed by pouring into a mixture of concentrated hydrochloric acid (100 g) and ice (400 g) with magnetic stirring. The precipitate was collected by suction filtration, washed with methanol and air-dried to provide an off-white powder (55 g). This crude product was recrystallized from ethanol (1,100 mL) to provide p,p'-dibromodeoxybenzoin as fine white needles (45 g, 55%). A portion of this material (24.5 g, 0.07 mol) was dissolved in methanol (400 mL). A sodium borohydride solution was prepared by dissolving sodium borohydride (2.8 g) in 10% sodium hydroxide (7 mL), followed by dilution with water (28 mL). The sodium borohydride solution was added gradually to the deoxybenzoin solution. The resulting mixture was refluxed for 2 h and then cooled. Methanol was removed in vacuo to provide a solid. The product can be collected by suction filtration, washed with water and air dried or optionally, dissolved in chloroform (200 mL) and extracted with water (200 mL×2) and dried over sodium sulfate and then concentrated to provide the title compound as an off-white solid (23.8 g, 97%). This product showed the expected proton NMR spectra.

EXAMPLE II 1,2-Di(p-bromophenyl)-1-methoxyethane: A mixture of 1,2-di(p-bromophenyl)-hydroxyethane (40 g, 0.056 mol), iodomethane (150 g) and powdered potassium hydroxide (30 g) was stirred at room temperature of 3 days. The reaction mixture was transferred into a 500 mL separatory funnel and water (200 mL) was added. The resulting mixture was extracted with chloroform (150 mL×2). The combined organic phases were dried through sodium sulfate and concentrated to provide an oil which was distilled under vacuum to give the title compound (40 g, 85%). This oil solidified upon standing and was recrystallized from methanol to provide fine crystals (mp: 53–54° C.), which showed the expected proton NMR spectrum.

EXAMPLE III 1,2-Di(p-bromophenyl)-1-acetoxyethane: A mixture of 1,2-di(p-bromophenyl)-hydroxyethane (7.2 g, 0.02 mol), acetic anhydride (20 mL, 0.2 mol), pyridine (20 mL) was stirred at 60° C. for 30 min. The solution was then allowed to stand at room temperature for 2 days. The mixture was poured into ice water (250 g) and extracted with methylene chloride (150 mL). The organic phase was extracted with 5% aqueous sodium carbonate (100 mL×2), 5% aqueous hydrochloric acid (100 mL×2), water (100 mL×2), dried over sodium sulfate and concentrated to give an oil (5.5 g) which solidified upon standing. This was purified by passing through a short alumina column followed by recrystallization from hexanes to give the above white solid product (4.2 g): mp: 61–64° C.

EXAMPLE IV 1,2-Di(p-iodophenyl)-1-methoxyethane: A mixture of 1,2-di(p-bromophenyl)-methoxyethane (7.4 g, 0.02 mol), potassium iodide (66 g, 0.4 mol), copper (I) iodide (38 g, 0.2 mol) and hexamethylphosphoramide (100 mL) was stirred magnetically under argon at 150–160° C. for 2 days. Upon cooling, the reaction mixture was poured into water/concentrated hydrochloric acid (800 mL/180 mL). Ether (300 mL) was added. The precipitate was collected by suction filtration, washed with ether, air dried followed by recrystallization from methanol to provide the above product as off-white fine needles (4.4 g, 48%) with a mp: 62°–64° C.

EXAMPLE V 1,2-DI(p-iodophenyl)-1-acetoxyethane: 1,2-di(p-bromophenyl)-hydroxyethane (17.8 g, 0.05 mol), potassium iodide (165 g), copper (I) iodide (95 g) and hexamethylphosphoramide (200 mL) was stirred at 150–160° C. for 48 h and then cooled. Work-up was as described in Example IV to provide a light yellow solid (10 g), which was the expected 1,2-di(p-iodophenyl)-1-hydroxyethane. A portion of this compound (7.2 g, 0.016 mol), acetic anhydride (16 mL), pyridine (16 mL) were heated at 60° C. for 30 min, followed by standing for 2 days. The resulting solution was worked up as in Example III to provide an oil which solidified upon standing. The solid was crystallized from hexanes to provide the title compound as a light yellow solid (4.3 g).

EXAMPLE VI 1-(5'-bromothien-2'-yI)-2-(4"-bromophenyl)-I-methoxyethane: Into a 1 L round bottom flask was added 4-bromophenylacetic acid (50 g, 0.232 mol) and thionyl chloride (110 g, 0.92 mol). The mixture was heated to reflux for 1 h and then cooled. Excess thionyl chloride was removed in vacuo to provide a solid (51 g). To this was added 2-bromothiophene (39 g) and methylene chloride (200 mL). While stirring, aluminum chloride (35 g) was added gradually through a powder addition funnel. The resulting dark mixture was stirred for 2 h and then poured into a mixture of concentrated hydrochloric acid (100g), ice (200 g) and water (200 mL). Chloroform (200 mL) was added and the resulting mixture was stirred until complete melting of ice. The organic phase was separated by a separatory funnel. The aqueous phase was extracted with chloroform (200 mL). The combined organic phases were neutralized with 5% aqueous sodium bicarbonate and concentrated in vacuo to provide a solid which was washed with ethanol (300 mL) and then collected by suction filtration, air dried to provide a powder (75 g). This product was boiled in ethanol. The insoluble material was removed by suction filtration while hot. The product recrystallized from the filtrate upon cooling to provide 1-(5'-bromothien-2'-yl)-2-(4"-bromophenyl)ethanone as a light yellow-orange plates (47.5 g). A portion of this product (18 g, 0.05 mol) and methanol (300 mL) was added into a 250 mL round bottom flask. To this was added a sodium borohydride solution, which was prepared by dissolving sodium borohydride (2.0 g) in 10% sodium hydroxide (5 mL), followed by dilution with water (20 mL). The resulting mixture was refluxed for 4 h and then cooled. Methanol was removed in vacuo to provide a brown solid. This product was dissolved in chloroform (200 mL) and the resulting solution was extracted with water (100 mL x 3). The combined aqueous phase was extracted with chloroform (100 mL). The combined organic phases were dried through sodium sulfate and then concentrated in vacuo to provide 1-(5'-bromothien-2'-yl)-2-(4"-bromophenyl)-1-hydroxyethane as a solid (16.1 g). This material, potassium hydroxide (12 g) and iodomethane (80 mL) were combined and stirred for three days. The resulting mixture was transferred into a 500 mL separatory funnel. Methylene chloride (200 mL) was added and the mixture was extracted with water (200 mL x2). The organic phase was dried through sodium sulfate and concentrated in vacuo to provide an orange oil which was vacuum distilled at 142–145° C./0.1 5 mm Hg to provide a light yellow oil (11.8 g, 63%) which showed the expected proton NMR spectra.

EXAMPLE VII 1,4-Phenylene bis[1'-(p-bromophenyl)-1'-hydroxyethyl]-: A mixture of p-phenylenediacetic acid (60 g, 0.31 mol), thionyl chloride (200 g, 1.68 mol) and dimethylformamide (10 drops) was stirred overnight. Excess thionyl chloride was removed in vacuo to provide a tan solid (76.3 g). To this was added methylene chloride (400 mL) and bromobenzene (157 g, 1 mol). To the resulting solution was added aluminum chloride (90 g, 0.68 mol) portion-wise. The resulting mixture was heated at 60° C. for 2 h, cooled and poured into concentrated hydrochloric acid (200 mL) and ice (800 g) mixture. The precipitate was collected by suction filtration, rinsed with methanol, and then transferred into an 1 L beaker containing methanol (500 mL). The mixture was magnetically stirred for 2 h to remove color. The washed solid was collected and air dried to provide 1,4-phenylene bis(p-bromoacetophenone) as an off-white solid (104.5 g, 65%). This was recrystallized from 1,2-dichloroethane to provide lightly color crystals (63 g, 39%). A portion of the diketone (18 g, 0.035 mol) and methanol (400 mL) was added into a 1 L round bottom flask to provide a mixture. To this was added a sodium borohydride solution, which was prepared by dissolving sodium borohydride (2.8 g) in 10% sodium hydroxide (7 mL), followed by dilution with water (28 mL). The resulting mixture was refluxed for 3 h and then cooled. The solvent was removed in vacuo to provide a solid. This was washed with water and air dried to provide the title compound as an off-white powder (14.5 g, 80%) showing the expected proton NMR speactrum.

EXAMPLE VIII 1,4-Di(p-bromophenyl)-1,4-dihydroxybutane: To a solution of fumaryl chloride (50 g, 0.327 mol), methylene chloride (300 mL), bromobenezene (157 g, 1.0 mol) was added aluminum chloride portion wise. The resulting dark solution was heated to reflux for 2 h, cooled and poured into a mixture of concentrated hydrochloric acid (200 g) and ice (800 g) with magnetic stirring. The aqueous phase was decanted. Chloroform (200 mL) was added to the residual to induce solidification of the product. After 30 minutes, the precipitate was collected, rinsed with methanol to remove color and air dried to provide a yellow powder (80 g). This was recrystallized from chloroform (900 mL) to provide 1,2-bis(p-bromobenzoyl)ethylene as bright yellow plates (63 g, 49%). A portion of this material (6.0 g, 0.0152 mol) was dissolved in tetrahydrofuran (100 mL). To the resulting solution was added a solution sodium borohydride (4.7 g, 0.123 mol) in water (15 mL). The resulting solution was stirred overnight. Water (100 mL) was added and the resulting mixture was extracted with chloroform (200 mL). The organic phase was extracted with water (200 mL×2), dried through sodium sulfate and concentrated to provide the title compound as a white mass (5.4 g) which showed the expected NMR spectrum.

EXAMPLE IX

The polymerization described in this example is represented in FIG. 1 by the coupling pathway. To a mixture of 1,2-di(p-bromophenyl)-1-methoxyethane (0.37 g, 1 mmol) and 4,4'-biphenyldiboronic acid (0.241g, 1. mmol) in tetrahydrofuran (10 mL) and potassium carbonate (15 mL, 1 M) was added a solution of tetrakis(triphenylphosphine)palladium (0.058 g, 0.05 mmol) in tetrahydrofuran (5 mL). The reaction mixture was reflux for 48 h and then cooled. Chloroform (50 mL) was added and the resulting solution was extracted with 1 N hydrochloric acid (30 mL) and brine (30 mL). The organic phase was dried and concentrated to provide a solid which was redissolved in tetrahydrofuran (10 mL) and precipitated into methanol (100 mL). The precursor polymer was collected by suction filtration and air dried to provide a pale color precursor polymer (0.35 g).

EXAMPLE X

Device Fabrication A 2% solution of the precursor polymer (0.1 g) prepared in Example IX in chloroform (5 mL) was prepared and filtered through a 0.4 micron filter. The solution was used to spin cast (at 1,000 rpm) on indium-tin-oxide glass substrates (2"×2") to provide thin films of about 500 Angstrom after vacuum drying. The first device was fabricated as follows based on the precursor thin film without thermal conversion.

Onto one of the aforementioned spin cast thin films was deposited an array of 150 angstrom of magnesium electrodes (4 mm in diameter), followed by depositing 100 Angstroms of protective silver coatings. The device was mounted in a sample box and fitted with pressure contacts. Voltage was supplied by a Hewlett-Packard 214B pulse generator. The device was operated using a 100 micron pulse width at a 10% duty cycle. The current was measured using a Tetronix 7904 oscilloscope with a Tektronix 7A1 9 amplifier. Luminance was measured with a calibrated silicon photovoltaic detector. At an applied voltage of 30 V, the device emitted blue light with the peak at 420 nm with the luminance of about 200cd/m².

A second device was fabricated by thermal conversion of the above described precursor polymer thin film by heating at 250°-300° C. for 5 h in the presence of small amount of hydrogen chloride gas in an inert atmosphere. This was followed by deposition of magnesium/silver electrodes. The resulting device emitted blue-green light with the peak at 490 nm with luminance of about 500 cd/m² at 25 V.

The abovementioned documents are incorporated herein by reference in their entirety.

Other modifications of the present invention may occur to one of ordinary skill in the art based upon a review of the present application and these modifications, including equivalents thereof, are intended to be included within the scope of the present invention.

What is claimed is:

1. A process for the preparation of polymers comprising:

polymerizing a first monomer of the formula X-cg-X with a second monomer of the formula Y-USG-Y in the presence of a metal containing reagent to form a soluble precursor polymer product of the formula

wherein X and Y represent substituents that are capable of undergoing coupling polymerization reactions, cg represents a convertible group, USG represents an unsaturated group, and n represents the number of first and second monomers contiguously coupled; and thermalyzing the precursor polymer product to form a converted polymeric product of the formula

wherein a is the degree of conversion, and CG is a converted group arising from conversion of the convertible group cg.

2. A process in accordance with claim 1 wherein X and Y substituents are separately selected from the groups consisting of (a) a halogen and a trifluoromethylsulfonate, and (b) a boronic acid, a boronic ester, trialkyltin, vinyl, a terminal alkyne, a trimethylsilylacetylene, and a 2-methyl-3-butyn-2-ol group; and the metal reagent is a palladium compound selected from the group consisting of dichlorobis (acetonitrile)palladium (II), dichlorobis(benzonitrile) palladium (II), dichlorobis(triphenylphosphine)palladium (II), dichlorobis(tri-o-tolylphosphine)palladium (II), palladium (II) acetate, palladium (II) chloride, tetrakis (triphenylphosphine)palladium (0), tris (dibenzylideneacetone)dipalladium (0), and mixtures thereof.

3. A process in accordance with claim 1 wherein X and Y substituents are separately selected from the groups consisting of(a) a halogen and a trifluoromethylsulfonate, and (b) CuBr, ZnBr, and MgBr, and the metal reagent is a nickel compound selected from the group consisting of bis(1,5-cyclooctadiene)nickel (0), [1,3-bis(diphenylphosphino) propane]nickel (II) chloride, Ni(II) chloride-2,2'-bipyridine, Ni(II) bromide-triphenylphosphine, and mixtures thereof.

4. A process in accordance with claim 1 wherein X and Y are independently bromine or iodine, and the metal reagent is a copper compound selected from the group consisting of copper iodide, copper sulfate, copper powder, copper bronze, and optional co-catalysts potassium hydroxide, potassium carbonate, pyridine, 2,2-bipyridine, amines, ammonia, ammonium chloride, and mixtures thereof.

5. A process in accordance with claim 1 wherein the convertible group -cg- is selected from the group consisting of groups of the formulas:

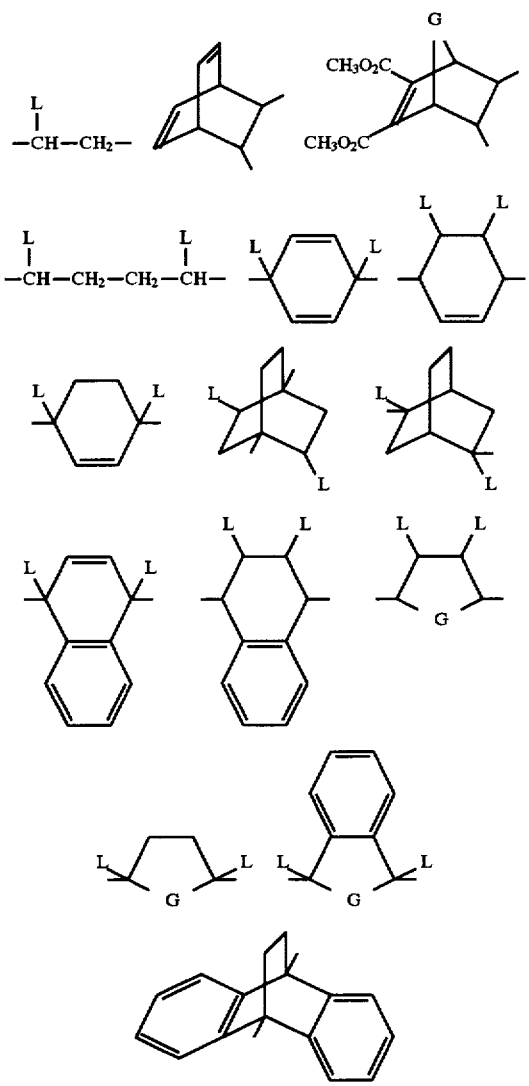

wherein L is a leaving group selected from the group consisting of halogen, hydroxy, methoxy, trifluoromethyloxy, benzyloxy, trimethylsilyl, methylthio, alkylsulfoxide, phenylthio, phenylsulfoxide, alklylsulfone, phenylsulfone, acetate, trifluoroacetate, phenylcarbonate, alkylcarbonate, trifluoromethylcarbonate, N,N-dialkyldithiocarbamato, alkyl xanthato, and mixtures thereof, and wherein G is selected from the group consisting of $CH_2$, $CH_2CH_2$, O, S, Se, NH, $NCH_3$, $NC_6H_5$ and mixtures thereof.

6. A process in accordance with claim 1 wherein the unsaturated group USG, is the same as or different from the converted group CG, and which USG group is selected from the group consisting of the groups as represented by the formulas:

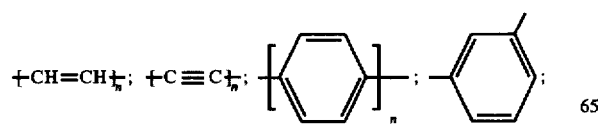

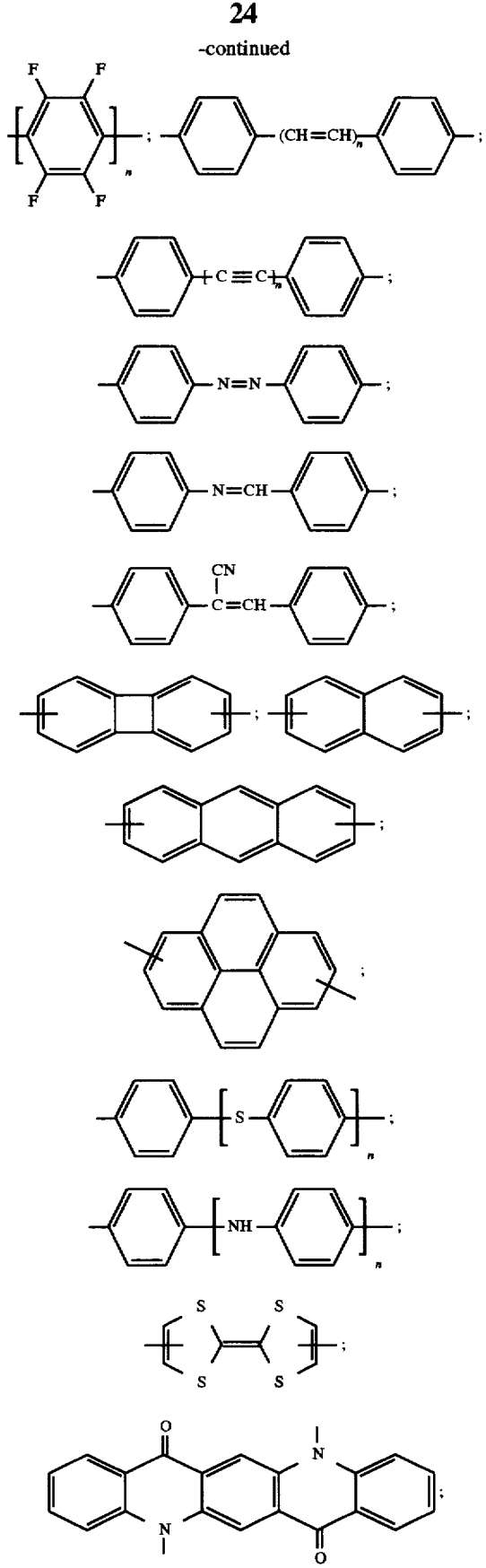

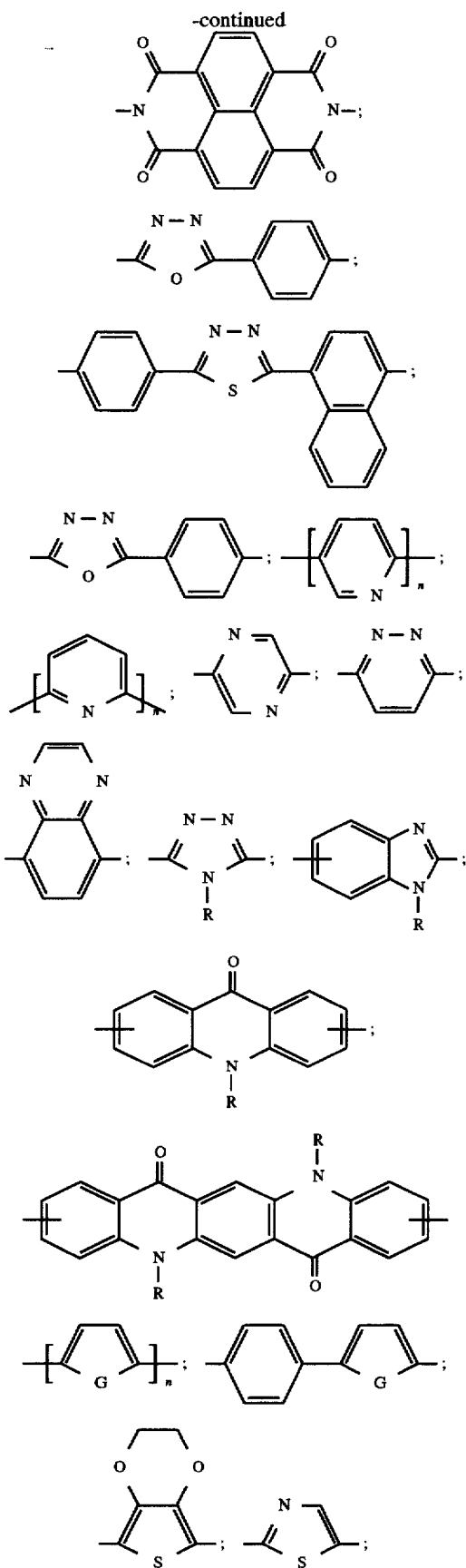

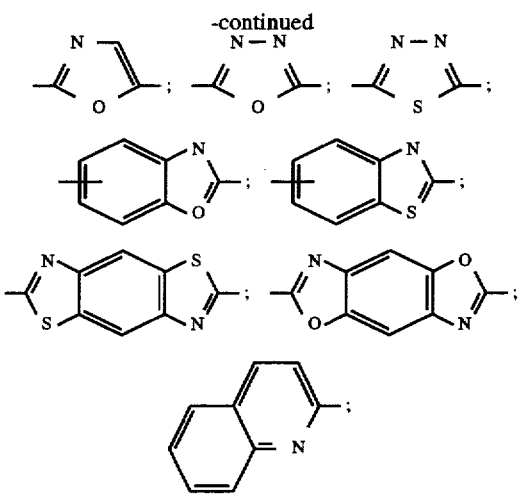

wherein G is selected from the group consisting of $CH_2$, $CH_2CH_2$, O, S, Se, NH, $NCH_3$, and $-NC_6H_5$, and R is a hydrogen, an alkyl with from 1 to about 20 carbon atoms, or an aryl with from 6 to about 25 carbon atoms; and n is an integer from 1 to about 10.

7. A process in accordance with claim 1 wherein the degree of conversion "a" is a number of from about 0.05 about 0.999.

8. A process in accordance with claim 1 wherein forming the precursor polymer is accomplished by solution polymerization in from about 2 hours to about 1 week by heating at a temperature of from about 25° to about 250° C.

9. A process in accordance with claim 1 further comprising forming a thin film of the soluble precursor polymer product and thereafter accomplishing the thermal conversion by heating at a temperature of from about 100° to about 350° C. for about 1 to about 24 hours under vacuum, under an inert atmosphere, or under hydrogen gas, and optionally in the presence of a catalytic amount of hydrogen halide gas.

10. A process in accordance with claim 1 wherein the second monomer is selected from the group consisting of hexamethylditin, hexabutyiditin, 1,2-di(trimethyltin)ethene, 1,4-di(trimethytin)benzene, 4,4'-di(trimethyltin)biphenyl, 4,4'-[di(trimethyltin)]phenyl ether, 4,4'-[di(trimethyltin)] phenyl sulfide, 1,4-phenylene-bis-boronic acid, 1,4-phenylene-bis-(ethylene glycol borate), 1,4-phenylenebis(pinacol boronate), 1,4-phenylene-bis(diisopropoxyborate), 4,4'-biphenylenediboronic acid, 4,4'-biphenylenebis (ethylene glycol borate), 4,4'-bis(boronic acid)phenyl sulfide, 1,4-diiodobenzene, 4,4'-diiodobiphenyl, 1,4-phenylene diacetylene, 1,4-divinyl benzene, 1,4-phenylene bistriflate, 4,4'-biphenylene bistriflate, 1,4-dichlorobiphenyl, 2,2'-bipyridine-6,6'-dimagnesium bromide, 2,2'-bithienyldizinc bromide, and the first monomer is selected from the group consisting of monomers as represented by the formulas wherein AcO is acetate and Me is methyl

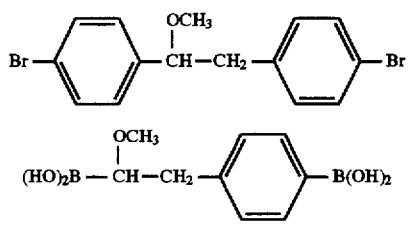

-continued

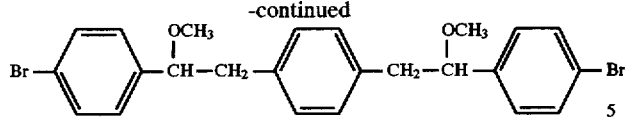

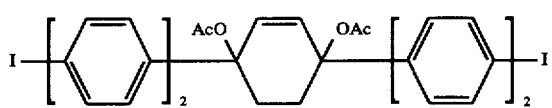

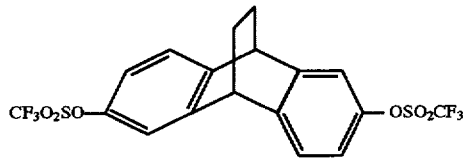

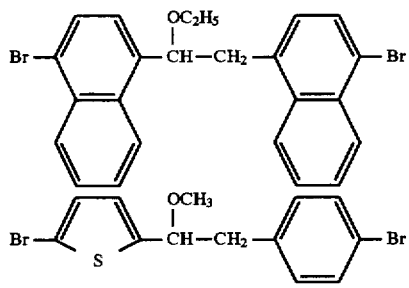

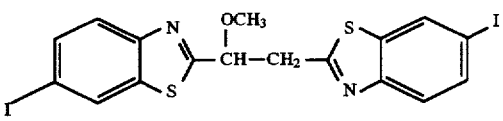

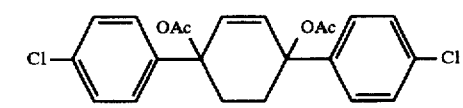

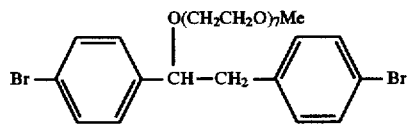

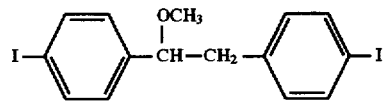

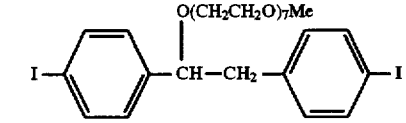

-continued

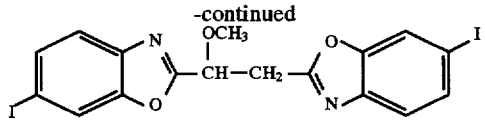

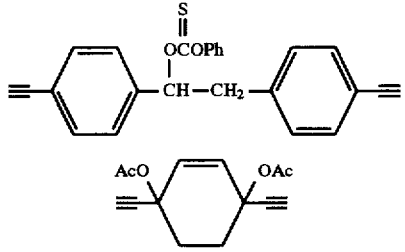

11. A process in accordance with claim 1 wherein the soluble precursor polymer product has a weight average molecular weight of from about 1,000 to about 100,000.

12. A process in accordance with claim 1 wherein the first monomer is of the formula Br-C$_6$H$_4$-CH$_2$-CH(OCH$_3$)-C$_6$H$_4$-Br and the second monomer of the formula (HO)$_2$B-C$_6$H$_4$-C$_6$H$_4$-B(OH)$_2$ and the metal reagent is tetrakis(triphenylphosphine)palladium wherein there results a soluble precursor polymer product of the formula -[-C$_6$H$_4$-C$_6$H$_4$-C$_6$H$_4$-C$_6$H$_4$-CH$_2$-CH(OCH$_3$)-]$_n$- wherein n is an integer from about 5 to about 1,000; and thereafter forming a uniform thin film of the soluble precursor polymer product, and thermalyzing the thin film to about 150° to about 350° C. for about 5 hours with a catalytic amount of hydrogen chloride to form a converted polymeric product of the formula -[-C$_6$H$_4$-C$_6$H$_4$-C$_6$H$_4$-C$_6$H$_4$-CH$_2$-CH(OCH$_3$)-]$_{(1-a)}$-[-C$_6$H$_4$-C$_6$H$_4$-C$_6$H$_4$-C$_6$H$_4$-CH=CH-]$_a$- wherein a is the degree of conversion and is equal to from about 0.05 to about 0.99.

13. A process in accordance with claim 12 wherein the soluble precursor polymer poly(p-tetraphenylene 1-methoxy ethyne) and the converted polymer product are electroluminescent polymers with a molecular weight of from about 10,000 to about 100,000.

14. An electroluminescent device comprising: a transparent conductive or semitransparent conductive substrate; a thin film comprised of a precursor or converted polymer of claim 1, wherein the film is of uniform thickness of about 10 nm to about 1 microns, and at least one low work function metal electrode deposited on the polymer thin film.

15. An electroluminescent device in accordance with claim 14 wherein the thin film is of the converted polymer of claim 1, with a degree of conversion "a" of from about 0.05 to about 0.99, and wherein the polymer has electroluminescence at from about 400 to about 700 nm.

16. A process for the preparation of electroluminescent polymers comprising:

polymerizing approximately equimolar amounts of a first monomer of the formula X-cg-X with a second monomer of the formula Y-USG-Y by condensation, optionally in the presence of a metal containing reagent, to form a soluble precursor polymer product of the formula -[-cg-Z-USG-Z-]$_n$- wherein X and Y represent condensation polymerizable groups, Z is a vinylene, imine, or phenylene group resulting from the condensation of X and Y, -cg- represents a convertible group, -USG- represents an unsaturated group, and n is an integer from 5 to about 10,000, and represents the number of first and second monomer pairs contiguously condensed;

forming a uniform thin film of the soluble precursor polymer product; and thermally converting the thin film of the precursor polymer product to form a converted polymeric product of the formula -[-cg-Z-USG-Z-]$_{(1-a)}$-[-CG-Z-USG-Z-]$_a$- wherein a is the degree of conversion, and -CG- is a converted group arising from the conversion of the convertible group -cg-.

17. A process in accordance with claim 16 wherein X and Y are different and are separately selected from the groups consisting of (a) a 2-pyrone or cyclopentadienenone group, and (b) an alkyne group, and wherein the resulting condensation group Z is a phenylene group.

18. A process in accordance with claim 16 wherein X is an aldehyde and Y is a methylene group adjacent to at least one electron withdrawing group selected from the group consisting of dialkyl phosphonate, nitro, cyano, trifluoromethyl, pentafluorophenyl, triphenylphosphonium halide, phenylsulfone, and mixtures thereof, and the resulting condensation group Z is a vinylene group containing at least one electron withdrawing group.

19. A process in accordance with claim 16 wherein X is an amino or ammonium halide group, Y is an aldehyde, and the resulting condensation group Z is an imine group.

20. A process in accordance with claim 16 wherein X and Y are aldehyde substitutents, and the metal reagent is a Ti (0) or Ti (I) compound in the presence of a reducing agent and wherein the resulting condensation group Z is a vinylene group.

21. A process in accordance with claim 16 wherein X and Y are both vinyl or methylvinyl groups and the metal reagent is a W, Mo or Ru compound, and the resulting condensation group Z is a vinylene group.

22. A process in accordance with claim 16 wherein the degree of conversion "a" is a number from about 0.05 about 0.999.

23. A process in accordance with claim 16 wherein polymerization to form a precursor polymer is accomplished by solution polymerization in from about 2 hours to about 1 week at about 25° to about 250° C.

24. A process in accordance with claim 16 wherein the thermal conversion of the soluble precursor polymeric product thin films is accomplished at a temperature of about 100° to about 350° C. in from about 1 to about 24 hours under vacuum, under an inert atmosphere, or under hydrogen gas, and optionally in the presence of a catalytic amount of hydrogen halide gas.

25. A process in accordance with claim 16 wherein the second monomer is selected from the group consisting of di-(2-pyron-6-yl), di-(2-pyron-4-yl), 1,4-di(2'-pyron-4'-yl) benzene, 1,3-di(2'-pyron-4'-yl)benzene, 4,4'-di(2"-pyron-4"-yl)biphenyl, 3,3'-di(2"-pyron-4"-yl)biphenyl, 2,5-dimethoxy-1,4-di(2'-pyron-4'-yl)benzene, 1,4-phenylenebis (2',4',5'-triphenylcyclopentadienon-3'-yl), 4,4'-biphenylenebis(2",4",5"-triphenylcyclopentadienon-3"-yl), 4,4'-[bis(2",4",5"-triphenylcyclopentadienon-3"-yl)]-p-diphenylether, 1,4-phenylenebis(2',5'-diethoxycarbonyl-4'-phenylcyclopentadienon-3'-yl), 4,4'-biphenylenebis(2",5"-diethoxycarbonyl-,V-phenycyclopentadienon-3"-yi), N-methyl-3,6-diformylcarbazole, 2,5-dimethoxy-1,4-phenylenediacetonitrile, 1,3-phenylenediacetonitrile, 2,5-diacetonitrile-1,3,4-oxadiazole, 2,5-diacetonitrile-3,4-(ethylene glycoloxy)thiophene, p-xylylenediphosphonic acid tetraethyl ester, p-xylylenebis(triphenylphosphonium bromide), 2,6-di(methylphosphonic acid tetraethyl ester) pyridine, 2,6-di(2',2',2'-trifluoroethyl)pyridine, 1,4-di (nitromethyl)-2,3,5,6-tetrafluorobenzene, N-methyl-3,6-carbazoledi(ammonium chloride), 2,5-dimethoxy-1,4-diaminobenzene, 3,4-diphenyl-2,5-di(4'-aminophenyl) thiophene, and the first monomers is selected from the group consisting of monomers represented by the formulas wherein OAc is acetate

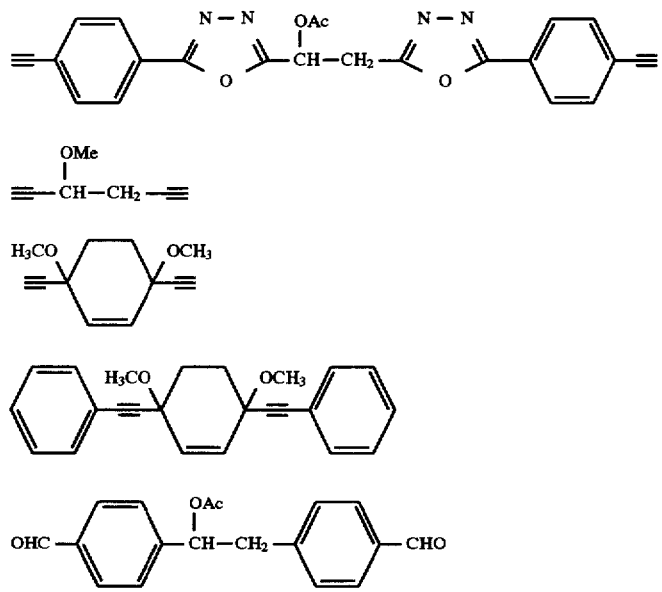

-continued

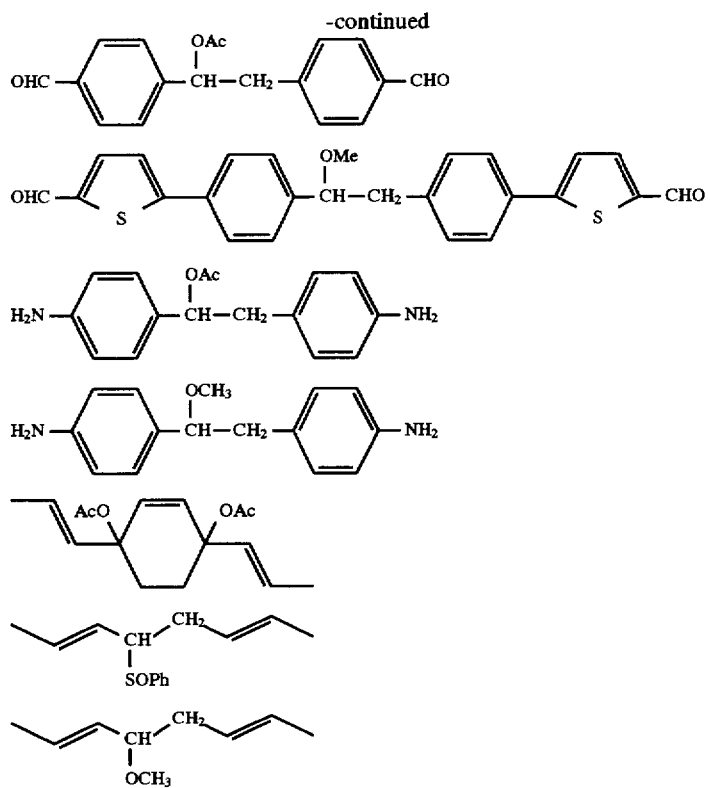

26. A process in accordance with claim 16 the soluble precursor polymer product has a weight average molecular weight of from about 1,000 to about 100,000.

27. A process in accordance with claim 16 wherein both the precursor polymer and the converted polymer are both electroluminescent polymers with a molecular weight of from about 10,000 to about 100,000.

28. A process in accordance with claim 1 wherein the first and second monomers are in approximately equimolar amounts and n is of from about 5 to about 10,000.

* * * * *